United States Patent
Kendrick et al.

[15] 3,662,817
[45] May 16, 1972

[54] PROCESS FOR ACCOMPLISHING HEAT EXCHANGE BETWEEN A CORROSIVE LIQUID PROCESS STREAM AND A SECOND LIQUID

[72] Inventors: Earl L. Kendrick; Harry W. Sandberg, both of Wilmington, Del.

[73] Assignee: E. I. du Pont de Nemours and Company, Wilmington, Del.

[22] Filed: May 26, 1970

[21] Appl. No.: 40,584

[52] U.S. Cl. ................................. 165/1, 165/145, 165/175
[51] Int. Cl. ............................................................. F28c 7/06
[58] Field of Search ................. 165/180, 132, 157, 144, 145

[56] References Cited

UNITED STATES PATENTS

| | | | |
|---|---|---|---|
| 3,526,274 | 9/1970 | Gardner | 165/158 X |
| 3,050,786 | 8/1962 | St. John et al. | 165/180 X |
| 2,973,944 | 3/1961 | Etter | 165/145 X |

FOREIGN PATENTS OR APPLICATIONS 145,249  3/1962  U.S.S.R. ............................... 165/180

Primary Examiner—Frederick L. Matteson
Assistant Examiner—W. C. Anderson
Attorney—Wilkin E. Thomas, Jr.

[57] ABSTRACT

The use of a plurality of heat exchange bundles, each comprising a plurality of tubular elements made from an organic polymeric composition and disposed serially in a narrow channel through which a heat exchange liquid flows in a manner such that substantially all of the flowing heat exchange liquid comes into contact with the tubular elements of each bundle before passing to the next bundle, thereby developing a temperature gradient in the fluid within the channel, provides a heat exchange system which is particularly useful in cooling hot process streams.

9 Claims, 7 Drawing Figures

INVENTORS
EARL L. KENDRICK
HARRY W. SANDBERG

BY *Wilbur E. Thomas Jr*

AGENT

INVENTORS
EARL L. KENDRICK
HARRY W. SANDBERG

BY

AGENT

PATENTED MAY 16 1972
3,662,817
SHEET 3 OF 3
FIG. 5
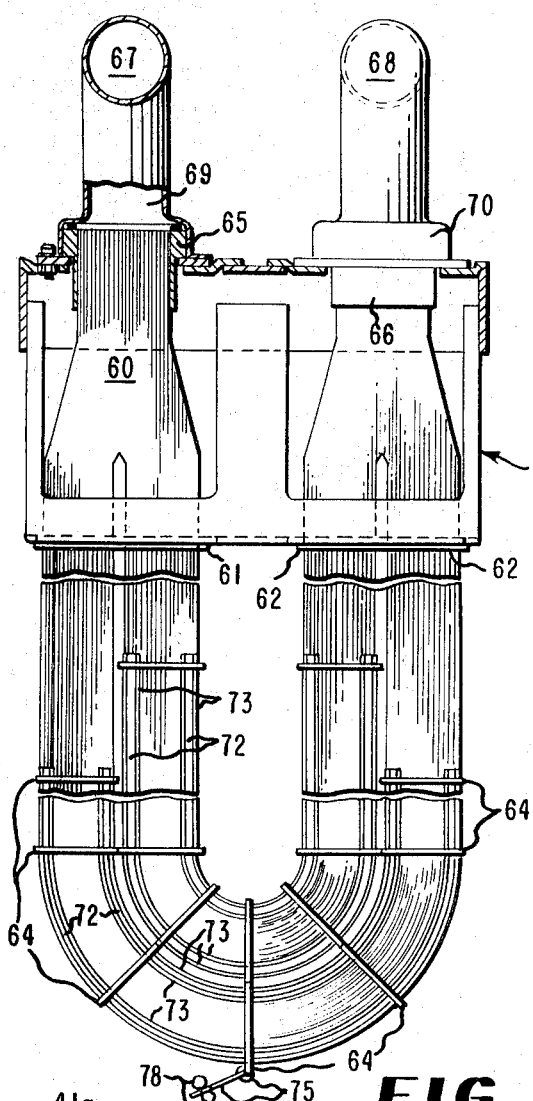
FIG. 6
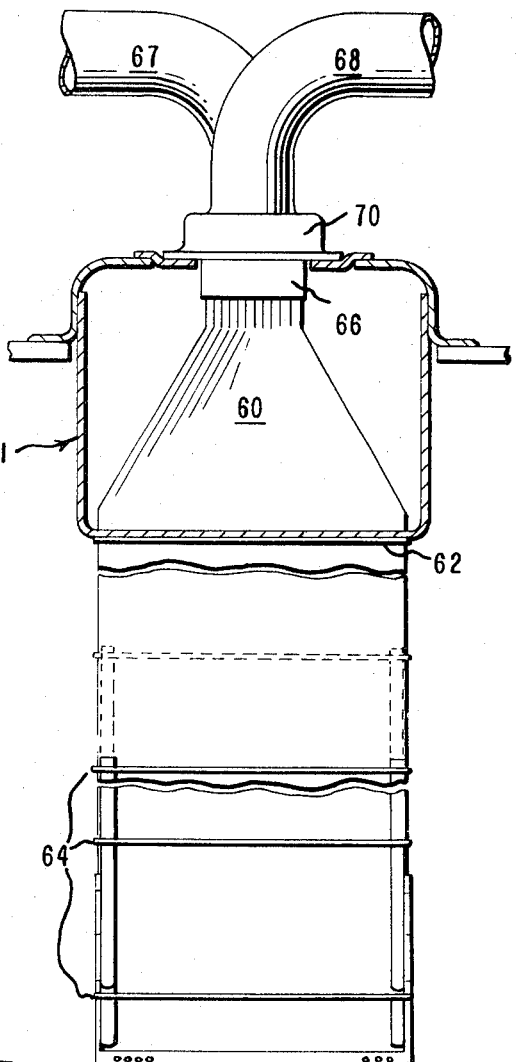
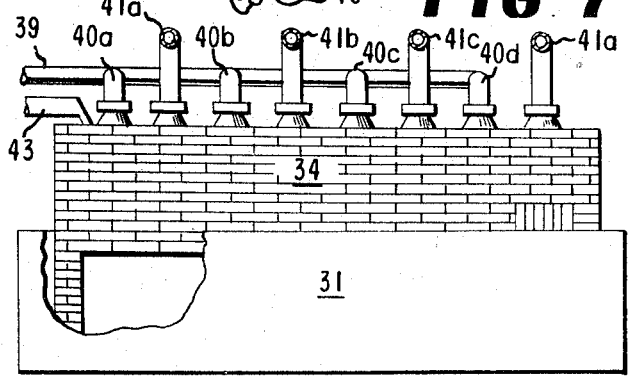
FIG 7
INVENTORS
EARL L. KENDRICK
HARRY W. SANDBERG
BY *William E. Thomas Jr.*
AGENT

A PROCESS FOR ACCOMPLISHING HEAT EXCHANGE BETWEEN A CORROSIVE LIQUID PROCESS STREAM AND A SECOND LIQUID

BACKGROUND OF THE INVENTION

This invention relates to an apparatus and method for heat exchange between a flowing liquid and a second liquid having a temperature significantly different than that of the flowing liquid. More specifically, it relates to an apparatus and process for cooling large volumes of hot corrosive liquids under process stream conditions. More specifically still, it relates to a new and improved heat exchange apparatus and process for cooling hot sulphuric acid during sulphuric acid manufacture.

There are at least two process steps in the manufacture of sulphuric acid where cooling a large volume of acid is required. One step where such cooling occurs is in conjunction with a drying tower where moist air to be used in the sulfur-burning process, is passed through concentrated acid to remove the moisture from the gas. This moisture dilutes the acid, and, due to the heat of dilution, typically raises the temperature of the acid to about 155° F. Before recirculating this acid, or passing it on to the absorbing tower where its concentration is increased, the acid is typically cooled to 115° F. In a 1,000 ton per day acid plant, typically 3,600 gallons per minute of acid are circulated through the drying tower. The second step where such cooling is necessary is in conjunction with the absorbing tower where the diluted sulphuric acid is permeated with dry sulphur trioxide to increase the concentration of the acid. In this process, the temperature of the acid typically reaches 230° F., and must be cooled to about 190° F., before further processing or storage. In a 1,000 ton per day acid plant, typically 6,500 gallons per minute of acid are circulated through the absorbing tower.

To remove the desired amount of heat from these massive quantities of liquid is a difficult task. The solution in general use today is far from satisfactory, and actually creates other problems. In each circulation system, literally thousands of cast iron heat exchangers are provided. These are generally finned sections of tubing stacked over one another in a matrix, over which cooling water is sprayed. Because so much heat must be removed, a large number of heat exchange tubes must be provided, increasing the volume of the recirculating system and the consequent volume of acid used in the recirculation system. In addition, while most of the water sprayed over the tubes is captured in sumps and recirculated, there is a continual mist over the cooling fields which constitutes a pollution problem. While the water itself is not a pollutant, combined with the ambient level of sulphur dioxide in the region of the acid plant and enhanced by any leaks that might occur in the acid lines, the acid laced mist becomes a serious pollution problem. Furthermore, the cast iron heat exchangers are a sacrificial system. There is no question but that the acid will etch through them, the only question is how long it will take. In normal operation, a section of heat exchange tubing will last from 3 to 8 years, at which time it must be removed and replaced. It cannot be repaired, and replacement generally requires a plant shut down which is expensive and time consuming. Also, since some cooling takes place by evaporation, a coating of the mineral content in hard water builds up on the heat exchange surface, cutting down the cooling efficiency. Finally, the sheer number of cast iron heat exchangers required to remove the desired heat, takes up significant space in an acid plant, using areas that could well be used to expand plant production or to hold a second absorbing tower which could be used to reduce the ambient level of sulphur dioxide at the plant site.

Shell and tube heat exchangers have been suggested to replace the spray type heat exchangers. Their use solves many of the problems that plague the present system, but some improvement is still possible. It is an object of this invention to provide an improved heat exchanger for use with flowing liquids, particularly hot corrosive liquids, which can be integrated into portions of the existing systems to replace the conventional acid cooling fields and their contingent acid header piping systems. It is a further object of this invention to provide an improved heat exchanger for use in cooling hot corrosive liquids under process conditions, using a sealed cooling liquid system whereby pollution problems are reduced. It is a still further object of the present invention to provide a simple heat exchanger system, for use in cooling hot corrosive liquids, in which sections of the entire system can be replaced or repaired on the plant site without necessitating plant shut down.

SUMMARY OF THE INVENTION

These objects are accomplished by providing an elongated tank or narrow channel for receiving the flowing heat exchange liquid, a plurality of heat exchanger bundles, each comprising a plurality of tubular elements made from an organic polymer composition, located within the tank, bundle securing means connected to the bundles and adapted to hold the bundles in a position within the tank and conduit means connected to each bundle to supply one end of each bundle with a second liquid having a temperature significantly different from that of the flowing liquid and to receive the second liquid from the other end of the bundle. The tank has an inlet means and an outlet means located at opposite ends of the tank to accommodate flow of the heat exchange liquid through the tank, and each bundle is disposed within the tank across substantially the entire flow path of the flowing heat exchange liquid in a manner such that substantially all of the flowing heat exchange liquid passes between and in intimate contact with the tubular elements of each heat exchange bundle in turn without substantial backflow of the flowing heat exchange liquid, so that a temperature gradient is maintained between the liquid at the inlet and outlet ends of the channel. For convenience in the discussion that follows, the apparatus and process will be described in terms of an apparatus and process for cooling a hot flowing heat exchange liquid with a second cooling liquid, but the apparatus and process are equally suitable for heating a cold flowing heat exchange liquid with a second hot liquid.

In a preferred embodiment, the bundles are U-shaped bundles positioned in the tank such that one leg of the U is upstream from the other leg, and the bundles comprise a plurality of tubular elements made from a fluorocarbon polymer composition and a plurality of spacer elements coacting with the tubular elements and the walls of the tank to maintain each tube in substantially equally spaced apart relation with respect to the other tubular elements and the walls of the tank. Anchoring means is also provided to prevent the portion of the bundles disposed near the bottom of the tank from being forced away from the bottom of the tank by the force exerted on them by the liquid flowing through the tank.

The system is particularly useful in process streams for the manufacture of hot corrosive liquids, such as sulphuric acid, because the structure can be integrated into existing equipment. In sulphuric acid manufacture, large pump tanks must be provided for both the absorbing tower and the drying tower to accommodate all the acid contained in these systems during periods when, for one reason or another, the tower is emptied. In one embodiment of the present invention, the elongated tank is formed between two concentric cylinders, the inner cylinder forming the walls of the pump tank, so that the narrow channel is a peripheral channel about the pump tank. The acid is introduced at one point in the channel and flows around both sides of the pump tank to a position opposite the acid inlet at which point it flows into the pump tank at a rate which will allow the process stream to cover or nearly cover each of the tube bundles, yet will maintain the level of the process stream below the top of the channel, and finally is pumped to the towers. The easiest way to effect transfer between the channel and the pump tank is to provide an overflow port to allow the acid to overflow into the pump tank, but since some cool acid may be trapped at the bottom of the tank, an adjustable sluice gate may be provided as well as the overflow port so that acid from both the top and the bottom of the tank will flow to the pump tank. Depending upon the circumstances, other geometrical configurations, such as a tank running across the diameter of the pump tank or one disposed above the pump tank could be used instead of a peripheral tank. Since the pump tank must be provided anyway, integrating the liquid cooling system into the pump tank, instead of in another area, has the advantage of freeing the acid cooling field for other uses, but a cooling tank which is completely separate from the pump tank can also be used. A secondary feature of applicant's invention, in its application to use with corrosive liquids is the fact that the supporting structure, which is used to position the tube bundles in the tank, can also be used to establish the tube spacing. This feature allows the spacing to be established by a rigid structure that need not be immersed in the corrosive bath, and once established, the spacing will not vary considerably throughout the remainder of the tube bundle. Although "Teflon" spacers can be and are used in the bath and as such aid in maintaining the established spacing, it is preferable to establish the spacing with more rigid material located above the bath and to use the "Teflon" spacers located in the bath primarily to keep the tube bundle from rubbing against the walls of the tank.

While the present invention is particularly useful in sulphuric acid manufacture, it is also useful in other situations where large volumes of hot flowing liquid must be cooled. As such it represents a new concept of process stream cooling in tanks where instead of lowering the temperature of all of the liquid contained in the tank or a compartment of the tank to the same uniform temperature, the temperature is reduced incrementally as it passes each, separately cooled, heat exchange bundle, so that a temperature gradient is maintained between the inlet and outlet ends of the process stream tank.

By cooling each tube bundle separately and allowing the hot flowing liquid to come into contact with each tube bundle only after it has been cooled by the preceding bundles in the series, the efficiency of the cooling system is increased to the point where large volumes of fluid can be cooled in a space where previously it had been felt that such cooling was impossible. The key to the operation of the system is to prevent intermixing of the hot and cooled liquid along the entire length of the cooling tank by preventing backflow of the cooler liquid into the region of the hotter liquid and bypass of the hot liquid past any of the heat exchange bundles. Conventional heat exchange systems, such as that disclosed in U.S. Pat. No. 2,869,834 for a Heat Exchanger issued on Jan. 20, 1959 to J. A. Clark et al., are wedded to the idea that the fluid to be cooled is contained in the tubes and the cooling fluid is contained in the shell. In those few cases where, as in the present invention, the liquid to be cooled is outside the cooling tubes and the cooling liquid is inside the tubes, there is no showing, and indeed no realization, that by proper orientation of the tube bundles incremental cooling of the hot liquid can be achieved and a temperature gradient can be maintained across the cooling tank to increase the efficiency of the cooling system to the point where effective cooling of large volumes of liquid can be achieved.

The operation and advantages of the present invention can best be seen by reference to the following figures; wherein:

FIG. 5 is a side view of one embodiment of a tube bundle useful in the present invention;

FIG. 6 is a front view of the tube bundle shown in FIG. 5;

FIG. 7 is a schematic diagram of a third embodiment of the present invention in which the cooling tank is disposed above the pump tank.

DETAILED DESCRIPTION OF DRAWINGS

Figure 1:
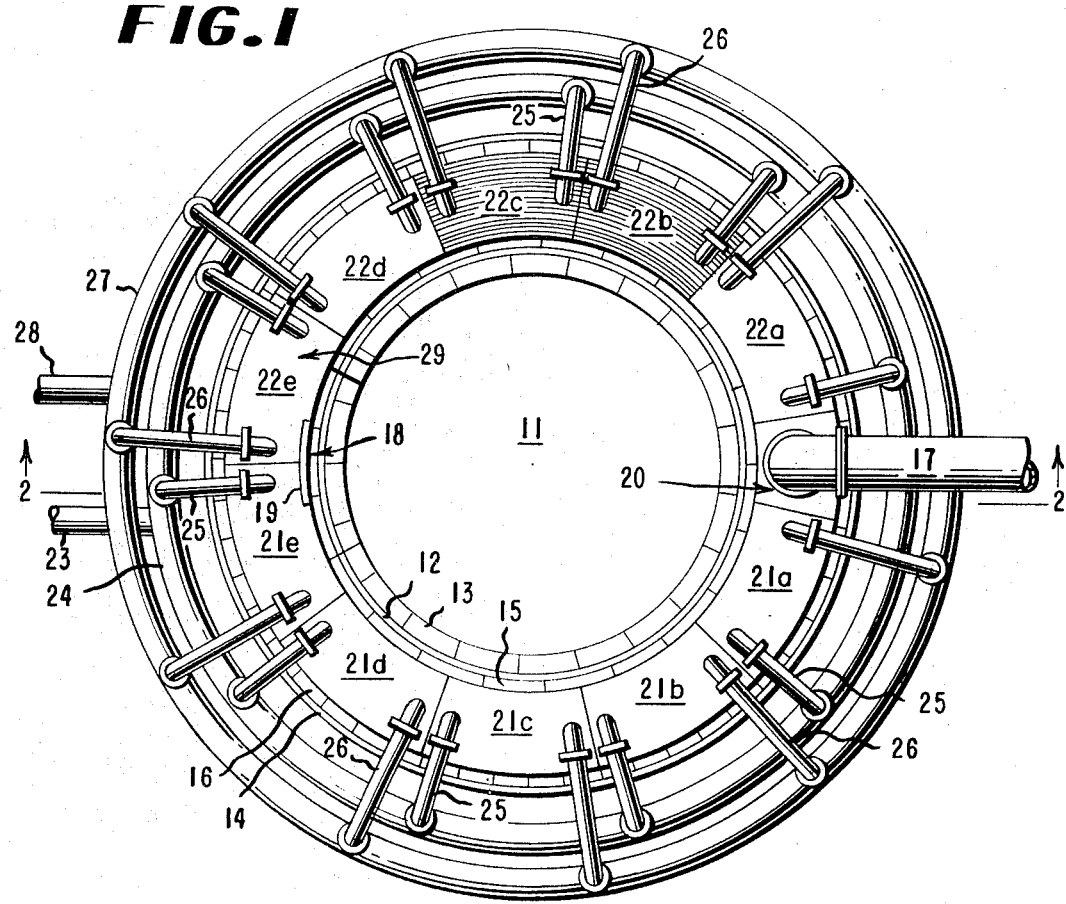
FIG. 1 is a top view of one embodiment of the present invention in which the cooling tank has been integrated into the pump tank as a peripheral channel.
Figure 2:
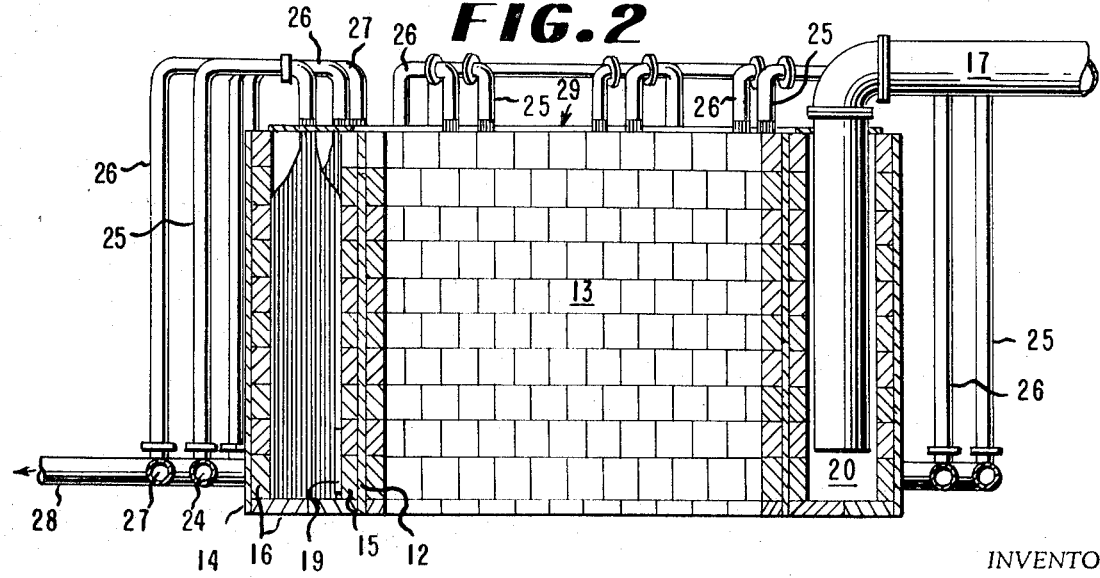
FIG. 2 is a cut away side view of the embodiment of the present invention shown in FIG. 1, through section 2—2.

In FIG. 1, which is a top view of one embodiment of the present invention and FIG. 2 which is a side view of the same embodiment, two concentric brick lined cast iron cylinders are shown. The pump tank 11 is defined by cast iron wall 12 and brick lining 13, and the narrow peripheral cooling channel 20 is formed between the cast iron walls 12 and 14 and brick lining walls 15 and 16. A cast iron pipe 17 leading from the acid tower empties into cooling channel 20 between the two brick lined cast iron cylinders. Acid leaving the pipe flows in both directions through the channel around the pump tank 11 to converge at a spot diametrically opposite from the pipe. The acid then flows into the pump tank through overflow port 18 at the top of the channel and adjustable sluice gate 19 at the bottom of the channel just below the overflow port. Acid entering the pump tank is then pumped from the pump tank by a pump, not shown, to its next position in the process stream. In the particular configuration illustrated, the original pump tank was defined by the outer cast iron and brick wall, and the inner cast iron and brick walls were inserted to form both the narrow channel and the present pump tank in the same space previously occupied by the old pump tank.

Heat exchange tube bundles 21a through 21e are positioned in the narrow channel on one side of the pump tank, and bundles 22a through 22e are positioned in the channel on the other side of the tank, so that in this embodiment, acid leaving pipe 17 will flow over five heat exchange bundles, no matter what direction around the channel it takes, before flowing into the pump tank. A cooling liquid, usually water, is supplied to each heat exchange bundle through inlet 23, manifold 24 and pipes 25. The cooling liquid leaves each tube bundle through pipes 26 which lead to manifold 27 and outlet 28. As illustrated, the individual tube bundles are connected to the cooling liquid supply through a covering plate 29 located over the acid bath; tube bundles 22b and 22c being left uncovered for the purpose of illustration only. The separate cover plates make removal of individual bundles possible. Alternately, the cover plates could be sealed in place for use in high pressure flow streams.

Figure 3:
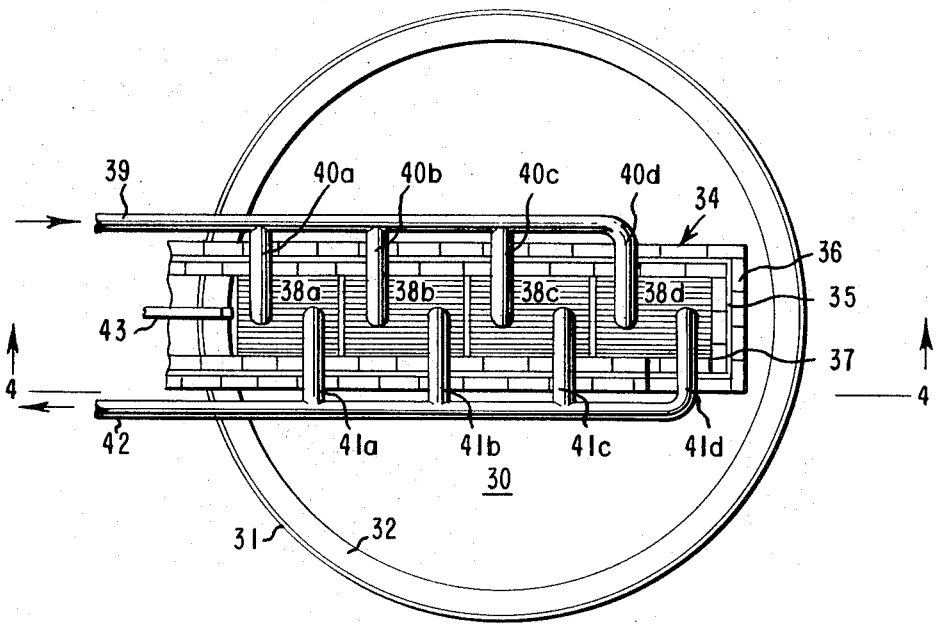
FIG. 3 is a top view of another embodiment of the present invention in which the cooling tank has been integrated into the pump tank.
Figure 4:
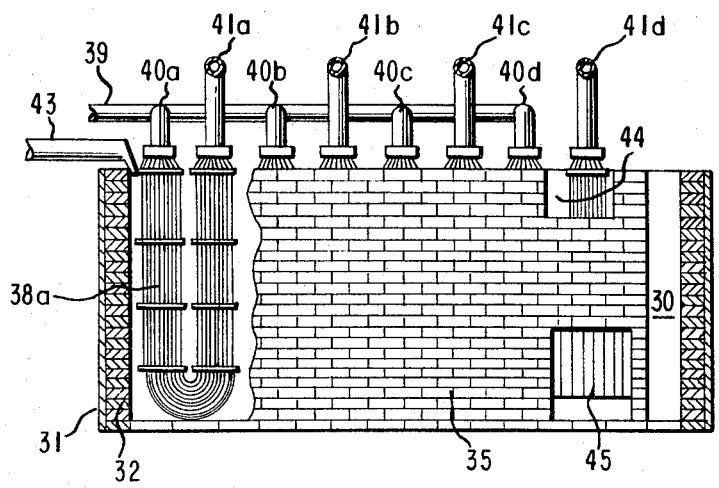
FIG. 4 is a cut away side view of the embodiment of the present invention shown in FIG. 3, through section 4—4.

In FIG. 3 which is a top view of another embodiment of the present invention and FIG. 4 which is a side view of the same embodiment, the pump tank 30 is defined by the cast iron wall 31 and brick lining 32. The cooling tank 34 is no longer a peripheral tank, but is a long narrow tank disposed across the diameter of the pump tank, leaving just enough clearance at the end to connect both sections of the pump tank. The cooling tank is defined by cast iron wall 35 and brick linings 36 and 37. Four heat exchange bundles 38a through 38d are positioned within the cooling tank 34. Each heat exchange bundle is supplied with cooling liquid through manifold 39 and pipes 40a through 40d, and cooling liquid leaves the bundles through pipes 41a through 41d and manifold 42. The hot liquid enters the cooling tank 34 through pipe 43 passes through all of the heat exchange bundles and flows into the pump tank 30 through overflow port 44 and adjustable sluice gate 45, from where it is piped to the next process station by a pump, not shown. If the ratio of the length to width of the cooling tank is too small, sequential cooling will not be achieved. The ratio, of course, depends on the circumstances but generally a length to width ratio of greater than 5:1 is preferred.

The operation of these two configurations is essentially the same, and depends to a large extent on the design of the heat exchange bundles. The bundles are comprised of a plurality of small relatively flexible tubular elements made from an organic polymer composition, preferably a fluorocarbon such as Teflon. Because of the low heat conductivity of organic material relative to metal, a large number of small diameter tubes are necessary to achieve the desired heat exchange.

Normally, each bundle contains between 500 to 3,500 individual tubular elements each having a diameter between 0.1 to 0.25 inches. The tubular elements are disposed in the tank across the entire flow path of the hot flowing liquid, extending from one wall of the narrow channel to the other and from the top of the channel to the bottom so that all of the hot flowing liquid will come into intimate contact with the tubular elements of each bundle in succession. Care must be taken so that bypass of the hot liquid by one of the bundles is minimized and so that backflow of the cooled liquid is minimized. With such care, a temperature gradient can be maintained between the hot flowing liquid entering the channel and then leaving it. If bypass or backflow become substantial, the temperature of the fluid in the tank will tend to a uniform temperature, reducing the efficiency of the cooling and rendering it impossible to cool large quantities of liquid in the space provided.

One particularly useful tube bundle design is illustrated in FIGS. 5 and 6 which are side and front views of the same bundle respectively. In this embodiment, a plurality of tubular elements, 60, are gathered into a single U-shaped tube bundle which, for convenience of construction, is divided into two or more sections, depending upon how many tubular elements are involved. In this embodiment, the individual tubes 60 are threaded through rigid spacer plates 61 and 62 which are made from a metal, a plastic, or any suitably rigid composition. Since these sections of the bundle will be kept out of the hot corrosive fluid, they may be made from a less corrodible material. At first it was thought that a rigid spacer would be needed throughout, but it was found that only two such spacer plates were needed to set the alignment of the tubes, and that once the alignment of the individual tubular elements was set at the ends of the bundle, it was maintained throughout the tube bundle without additional aid. Non-rigid spacer plates 64 made from a noncorrodible material such as Teflon can be and are used within the bath, and as such aid in maintaining the spacing, but their primary purpose is to keep the individual tubular elements from rubbing directly against the walls of the tank. Each tubular element in the tube bundle, then, is threaded through the two rigid spacer plates 61 and 62 and a plurality of flexible spacer plates 64 to form the U-shaped configuration illustrated. The ends of the individual tubes are then gathered together and contained in sleeves 65 and 66 which form the inlet and outlet means of the tube bundles and are connected to the cooling liquid headers 67 and 68 by flanges 69 and 70. There are a number of ways in which the end structure can be constructed. One particularly useful way is described in U.S. Pat. No. 3,315,740 for a Flexible Plastic Tube Bundle and Method of Making issued on Apr. 25, 1967 to M. S. Withers. This patent describes a way to honeycomb the individual tubular elements together and to bond them to one another and to the walls of the tube sleeve so that an end structure having no leaks is formed. While this method is useful and convenient, any well known manner, such as molding, for forming an end structure for the tube bundle can be used. The bundle is then connected to a supporting structure 71 used to support the bundle in the cooling tank, in a manner such that the rigid spacer plates do not enter the acid, and also to support the end structures of the tube bundles in a manner such that the conduits for cooling liquid can be conveniently and securely attached to them.

Since the hot liquid flows through the cooling tank, some means must be provided to anchor the bundles so that they do not sway up from the bottom of the tank and provide a bypass path for hot liquid beneath the bundle. Some means to physically attach the bottom of the tube bundles to the bottom of the cooling tank could be used, but this would make removal of the tube bundle difficult. In the embodiment illustrated, the anchoring means is provided by a series of lead rods 72 which are first inserted within a Teflon tube 73 and then strung through the spacer plates 64 along with the individual tubular elements. These rods are used to weight the bundles so they are forced to the bottom of tank and as such they provide an anchoring means which leaves the individual tube bundles free to be removed from the tank at will. The lead rods are disposed at the four corners of each section of the tube bundle. They need not extend up to the surface of the hot liquid but since they are to act as anchoring means, can be confined to the bottom of the bundle. They can be completely encased in the Teflon tubing that surrounds them, by sealing the ends of the Teflon tubing around the lead rods, so that the entire structure is protected from the corrosive liquid. As an aid to spacing the Teflon spacer plates, the lead rods are pinched through the Teflon tubing on each side of the spacer plates 64 to deform the lead rods on either side of the spacer plates and lock the spacer plates in position.

To further aid in preventing bypass of the fluid under the tube bundle, a sheet of Teflon, 75, is attached to the bottom spacer plate 64 by Teflon lacing 77. The sheet 75 is weighted with Teflon coated lead rods 78, and acts like a baffle. If the tube bundle moves upward, the sheet swings downward to prevent hot liquid from bypassing the tube bundle by flowing under it.

FIG. 7 illustrates another embodiment of the present invention wherein the cooling tank 34 is located above the pump tank 31 so that the hot flowing liquid will flow from the cooling tank to the pump tank through the overflow ports and sluice gate by force of gravity.

The embodiments illustrated are particularly useful in process stream applications where each individual tube bundle can be removed from the tank for repair without shutting down the plant. If one or more tubular elements spring a leak, they can be plugged on site and placed back into operation immediately. It is to be understood, however, that a number of other configurations both in the construction of the cooling tank and in the construction of the tube bundles is possible. For example, the cooling tank could be located above or outside the pump tank, and could also be sealed if high pressure flow was required. Also a braided bundle rather than a spacer plate bundle could be used and the entire structure can be used to heat a cold liquid rather than cool a hot liquid. The above discussion is for the purpose of illustrating the usefulness of the present invention and is not meant to limit the scope of the invention set forth in the following claims.

What is claimed is:

1. A process for accomplishing heat exchange between a corrosive liquid process stream and a second liquid comprising the steps of:
    a. introducing said process stream into the inlet end of a narrow channel;
    b. providing a plurality of heat exchange bundles spaced along the longitudinal extent of said narrow channel, each of said heat exchange bundles being disposed across substantially the entire flow path of said process stream through said narrow channel, each of said heat exchange bundles comprising a plurality of tubular elements made from an organic polymer composition;
    c. supplying each tubular element in each heat exchange bundle with a second liquid having a temperature significantly different than that of said process stream;
    d. allowing said process stream to flow through said narrow channel in a manner such that substantially all of said process stream passes between and in intimate contact with the tubular elements in each of said heat exchange bundles in seriatum whereby a temperature gradient is maintained between the process stream at the inlet and outlet end of said narrow channel; and
    e. allowing said process stream to exit from the outlet end of said narrow channel by providing an outlet orifice which will maintain the height of said process stream below the top of said narrow channel and near the top of each heat exchange bundle.

2. The process of claim 1 wherein said process stream is a hot liquid and said second liquid is a cooling liquid supplied in parallel to each heat exchange bundle.

3. The process of claim 1 wherein said process stream is a cold liquid and said second liquid is a heating liquid supplied in parallel to each heat exchange bundle.

4. The process of claim 1 wherein the step of allowing said process stream to exit from the outlet end of said narrow channel is accomplished by providing an overflow port near the top of the outlet end of said narrow channel and allowing said process stream to overflow from said narrow channel into a storage tank.

5. The process of claim 1 wherein the step of allowing said process stream to exit from the outlet end of said narrow channel is accomplished by providing an overflow port near the top of the outlet end of said narrow channel to allow a portion of said process stream to overflow from said narrow channel into a storage tank and by additionally providing an adjustable sluice gate near the bottom of the outlet end of said narrow channel to allow a portion of said process stream to pass from said narrow channel to said storage tank through said sluice gate.

6. The process of claim 5 wherein each of said tube bundles comprise 500 to 3,500 tubular elements, each having a diameter of 0.1 to 0.25 inches, and wherein said organic polymer composition is a fluorocarbon polymer composition.

7. The process of claim 5 wherein the step of introducing said process stream into the inlet end of a narrow channel is accomplished by introducing said process stream into a channel formed integrally with said storage tank.

8. The process of claim 7 wherein said narrow channel is a channel formed between a first cylinder and a second smaller and concentric cylinder forming said storage tank.

9. A process for cooling hot sulphuric acid within the pump tank used in sulphuric acid manufacture comprising the steps of:

a. providing a narrow peripheral channel around said pump tank;

b. introducing said hot sulphuric acid into the inlet end of said narrow channel;

c. providing a plurality of heat exchange bundles arranged in series within said narrow channel, each of said heat exchange bundles being disposed across substantially the entire flow path of said sulphuric acid through said narrow channel, each of said heat exchange bundles being made from a fluorocarbon polymer composition;

d. supplying each heat exchange bundle with cooling liquid having a temperature significantly less than said hot sulphuric acid;

e. allowing said sulphuric acid to flow through said narrow channel in a manner such that substantially all of said sulphuric acid passes between and in intimate contact with the tubular elements in each of said heat exchange bundles in turn, whereby a temperature gradient is maintained between the sulphuric acid at the inlet end of said narrow channel and the sulphuric acid at the outlet end of said narrow channel; and f. allowing said sulphuric acid to exit from the outlet end of said narrow channel into said pump tank by providing an overflow port near the top of the outlet end of said narrow channel to allow a portion of said sulphuric acid to overflow from said narrow channel into a storage tank and by additionally providing an adjustable sluice gate near the bottom of the outlet end of said narrow channel to allow a portion of said sulphuric acid to pass from said narrow channel to said storage tank through said sluice gate.

* * * * *